March 22, 1949.   E. O. WHEATON   2,465,334
TRANSMISSION
Original Filed April 16, 1934
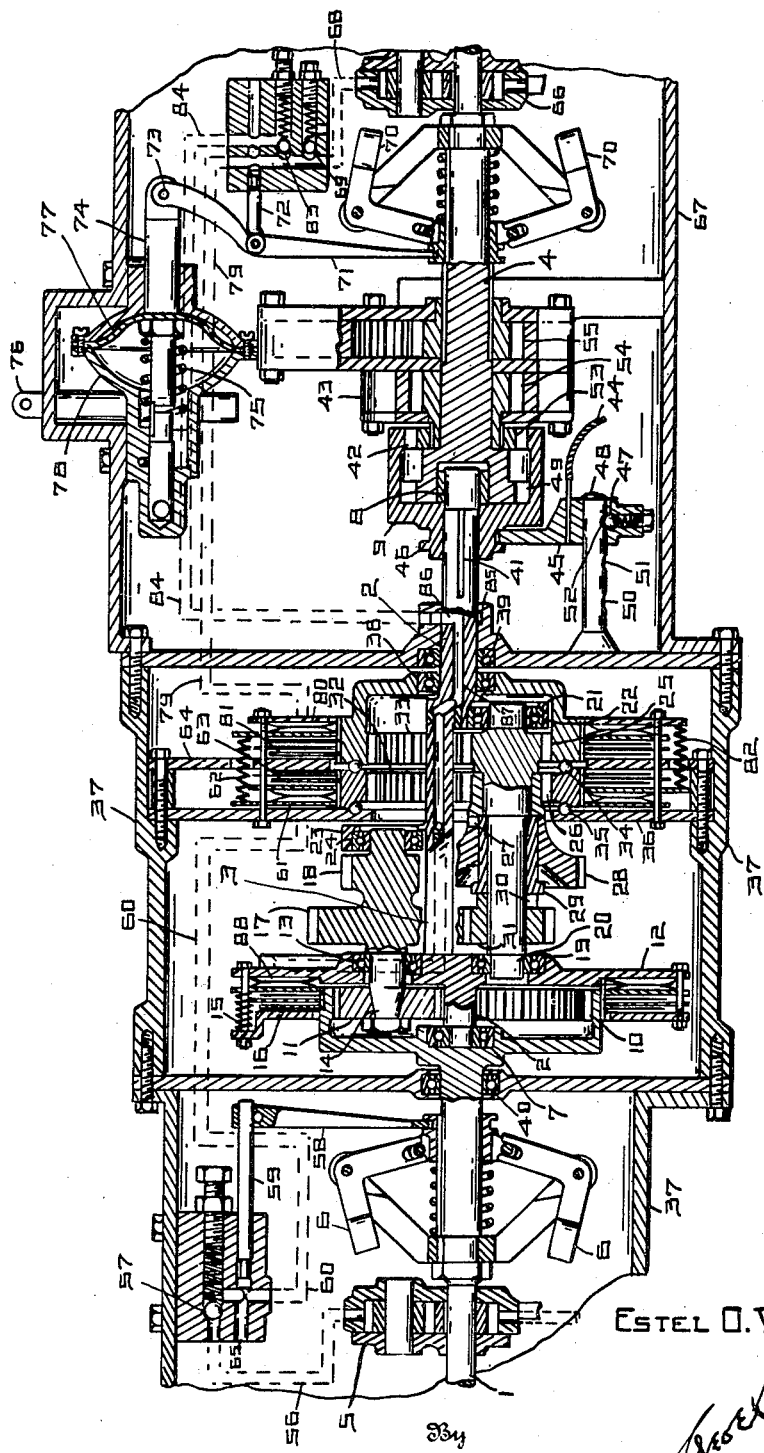
Inventor
ESTEL O. WHEATON
By 
Attorney Patented Mar. 22, 1949

2,465,334

UNITED STATES PATENT OFFICE 2,465,334

TRANSMISSION

Estel O. Wheaton, Toledo, Ohio, assignor to Kelly-Wheaton Company, Toledo, Ohio, a corporation of Ohio Original application April 16, 1934, Serial No. 720,822, now Patent No. 2,181,647, dated November 28, 1939. Divided and this application January 16, 1943, Serial No. 472,587

12 Claims. (Cl. 74—752)

This invention relates to features of control for varying the interconnection between driving and driven shafts.

This invention has utility when incorporated in transmissions including manually shiftable control means and at least to some extent interconnected relatively automatic supplemental control means. The disclosure herein, as adapted for motor vehicle use, may be cut in by connection from an accelerator pedal. A manually operable selector may be shifted out of neutral into reverse or forward. In so starting for forward, there is hydraulic control responsive to the driven shaft pick-up, which as so selected respective speeds may be designated as first, second and third forward speeds. With the driven shaft aligned with the driving shaft, the interconnection is shown to include planetary gearing as well as approximately coaxial hydraulic control duct portions.

Referring to the drawing, the figure is a longitudinal section of an embodiment of the invention, having to do with a driven shaft actuated pump in an automatic control as brought out in co-pending application Ser. No. 245,835, filed December 15, 1938, Patent No. 2,320,960 June 1, 1943, Transmission control, of which this case is a continuation-in-part, as well as from divisional subject-matter of Patent No. 2,181,647 Nov. 28, 1939, having to do more particularly with the incorporation in Fig. 22 thereof, of the broken away portion in detail in Fig. 4 and in assembly in Fig. 1 of said patent.

The power fluid control is shown herein in association with flyweight type of governors. A driving shaft 1 extends to an intermediate shaft 2 having an offset or crank forming portion 3. The intermediate shaft 2 extends to a driven shaft 4. The driving shaft 1 has thereon a fluid power device or gear pump 5 and a speed governor or flyweight device 6. A bearing 7 permits relative rotation between the driving shaft or section 1 and the intermediate or follower section 2. A bearing 8 in a housing 9 permits relative rotation between the section 2 and the driven shaft or section 4.

Fixed with the shaft section 1 is a spider having an overhang forming an internal gear 10 in mesh with planetary gearing pinion 11. The shaft section 2, at the offset 3 toward the bearing 7, has a plate portion 12 having therein a bearing 13 for a stub shaft 14 mounting the pinion 11. Compression helical spring means 15 serve normally to hold a multi-disk mechanical friction grip device of clutch 16 against connecting the plate 12 with the internal gear or overhang 10. The pinion 11 is fixed with the stub shaft 14 which has a gear 17 and a pinion 18 formed as a part of said shaft 14. 180° from the bearing 13, the plate 12 has a bearing 19 for a shaft 20. Remote from the bearing 19, a bearing 21 is in a crank or eccentric 22 from the shaft 2. From the offset portion 3 of the shaft 2 and 180° from the bearings 19, 21, there is a supplemental offset 23 for a bearing 24 adjacent the pinion 18, and there providing support for the pinion 18 portion from the shaft 14.

The minor intermediate shaft 20, parallel to the line of the axis common to the shaft sections 1 and 4, has fixed therewith adjacent the bearing 21, a pinion 25. Loose on the shaft 20, and adjacent the pinion 25, is a pinion 26, connectable through an over-running clutch device 27 with a gear 28 loose on a sleeve 29 fixed with the shaft 20. An over-running grip device or clutch 30 from the sleeve 29 serves to connect a pinion 31, on the shaft 20 adjacent the bearing 19, in mesh with the gear 17. The gear 28 is in mesh with the pinion 18.

An internal gear 32 is in mesh with the pinion 26. The gear 32 may be free to rotate, as also companion internal gear 33 in mesh with the pinion 25. An antifriction bearing 34 is between the gears 32, 33. A bearing 35, for the opposite side of the gear 32, is in a plate 36 fixed with the installation unit at a housing section 37. The remote side of the gear 33 has a bearing 38 on the intermediate shaft 2 adjacent its after bearing 39. The bearing 39 is in axial alignment with the bearings 7, 8, and a bearing 40 for the driving shaft 1.

A spline connection 41 mounts the housing 9 for rotation with the intermediate shaft 2. The slidable housing 9 has an annular toothed clutch element 42 adjacent a fixed housing section 43. A control wire 44 is connected for manually shifting a fork 45 engaged with a collar 46 of the housing 9. The fork 45 has a ball stop device 47 adapted to coact with seats in an arm 48 fixed with the general housing 37. At the limiting shift of the housing 9 away from the housing section 43, the clutch element 42 is in mesh engagement with a complementary toothed clutch element 49, with the stop device 47 then engaging with a seat 50 for holding the transmission in for direct forward driving, initially at first speed, from the intermediate shaft section 2 to the driven shaft section 4. In operating the wire 44 to bring the fork 45 for the stop device 47 to engage an intermediate seat 51, then the clutch element 42 is clear of the element 49 and the transmission is in neutral or is disconnected. A further operation of the wire 44, to bring the housing 9 to position against the housing 43, is retained by the stop device 47 engaging with a seat 52 in the arm 48. The element 42 is now in mesh with a complementary toothed clutch element 53, loose on the shaft 4 and connected to a pinion 54 having connection in the housing 43 with a reversing gear train to a pinion 55 fixed with the shaft 4.

First speed forward

With the selector wire 44 shifted to locate the fork 45 for the stop device 47 to coact with the seat 50, the manual control has made a selection for forward, say with the installation driven from an internal combustion motor for an automobile. At this selection, one may consider that the motor has been started and that the driving shaft 1 is rotating. This causes the driving shaft actuated power fluid control or gear pump 5 to draw oil from the sump or general housing 37 for flow by a duct 56 as controlled by a pressure relief valve 57. The speed device 6, as the driving shaft rotation builds up, may act through an arm 58 to shift a plunger valve 59 for pressure fluid to flow by a duct 60 to hydraulic chamber means 61, where compression helical spring means 62 normally holds multiple disk mechanical friction grip device or brake 63 released. However, the fluid pressure, say adjusted for 10# by the valve 57, may be effective at the chamber means 61 to overcome the spring means 62 and thereby cause the grip device 63 to lock the internal gear 32 with a plate 64 fixed with the housing 37. This means that the driving shaft 1, through the gear 10, pinion 11, shaft 14, pinion 18, gear 28, and the pinion 26 in mesh with the held gear 32, are now effective to transmit first or slow speed to turn the crank 22, the intermediate shaft section 2, and through the clutch connection 42, 49, rotate the driven shaft 4.

Disconnection may occur automatically as to this first forward speed, upon slowing down of the driving shaft 1. The flyweight device 6 then shifts the plunger 59 for return flow of fluid from the duct 60 to discharge at a spill port 65. This allows the spring means 62 to exhaust the chamber means 61 and release the grip device 63. The gear 32 is thus free again.

Second speed forward

Succeeding the building-up of speed for the first speed forward through the holding of the gear 32 by the grip device 63, there may be actuation from the driven shaft 4 of the driven shaft actuatable power fluid control or gear pump 66. Oil from the sump or housing 67 is forced by this pump 66 through a duct 68 to a pressure relief valve 69, set at say 40#.

On the driven shaft 4, adjacent the pump 66, is a speed governor or flyweight device 70, effective through an arm 71, connected to a plunger valve 72. The arm 71 has a connection 73 to an additional plunger valve device 74. Inactive or outwardly thrust position for the plunger valve device 74 is normally maintained by a compression helical spring 75. A manually operable control or stem 76 may open up a connection from the suction intake of an internal combustion motor as operating the driving shaft 1. This sub-atmospheric pressure may cause a diaphragm 77 in a chamber 78 to overcome the spring 75.

The control 76 introduces a manual feature of influence to affect the transmission. The control 76 may be connected to be operated from the accelerator pedal. As so cut in, it leaves the functioning response for the hydraulic control build-up of speed automatic. The vacuum influence from the started motor, in moving the connection 73, has so moved the valve 72 that it is more in position to respond to the speed device 70 through the common arm 71 therebetween.

The shifting of the valve 72 connects the ducts, in the hydraulic system having these distributive valves, for flow of motive fluid from the driven shaft actuatable pump 66 to a duct 79 extending to hydraulic chamber means 80 at a multiple disk mechanical friction grip device or brake device 81. Compression helical spring means 82 normally hold the grip device 81 released from engaging action between the plate 64 and the internal gear 33. At this grip stage, there is transmission from the driving shaft 1, toothed gearing 10, 11, 17, 31, 25, 33, for a higher or second speed forward driving of the shafts 2, 4. This higher speed is determined by the ratio of the driving gear 17 being in mesh with the driven pinion 31 in this speed. For the lower or first speed, the transmission was from the pinion 18 to the gear 28. The rotation of this extended planetary gearing is effected from the internal gear 10. In this operation at second speed forward, the grip device 63 is not released, but holds the gear 32 connected. This connection is not one to disturb the higher or second speed, for the over-running clutch device 27 allows the transmission of this higher speed.

Third speed forward

In addition to the relief valve 69 set at 40#, there may be provided a relief valve 83, adapted as the plunger 72 has opened the way from the duct 68, for permitting pressure flow at say 30# by way of a duct 84 to a ring chamber 85 adjacent the bearing 39. A radial port 86 in the shaft 2 is in communication with an axial and offset passage 87 along the intermediate shaft 2. The ring chamber 85 and the axial portion of the passage 87 adjacent the radial port 86, are each coaxial with the driving shaft 1 and the driven shafts 2, 4. The hydraulic control coaxial passage portion 87, from the intermediate shaft 2, has a radially extending portion into the plate 12 for communication with hydraulic chamber means 88 to cause the multiple disk clutch 16 to be operated against the resistance of the spring means 15, thereby to lock the plate 12 with the gear 10.

A direct drive connection is now effected for third or high speed forward driving of the shaft 4 from the shaft 1. At once the driven speed slackens, the pressure developed from the driven speed pump 66 is not so great and there follows therefrom an automatic checking back of the automatically selected speed to a different respective speed ratio. It is to be noted that after the first speed forward connection, the various automatic controls are effective variously and away from thru, about or upon the driving shaft 1. The second and third speed forward controls are responsive to the speed of the driven shaft 4, thru hydraulic and transmission effective connections brought into operation thru and from the driven shaft 4 in following from the driving shaft 1.

Planetary gearing connects the driving shaft with an intermediate shaft aligned or coaxial therewith. Connection is completed to the driven shaft, through the manual control, which may also be so operated as to connect for reverse, by selecting the throw position therefor. The manual selection for neutral releases the driven shaft from the gearing of the intermediate shaft. The over-running clutch 30 permits the second speed or faster driving through the gearing as over first speed. The driven shaft actuatable pump 66 is an automatic speed control feature. Hydraulic pressure at the grip means 63, does not interfere for second speed forward through the grip means 81; nor both thereof when there is third speed forward connection through the grip means 16, due to the over-running clutch devices 27, 30, on the shaft 20.

What is claimed and it is desired to secure by Letters Patent is:

1. A transmission embodying a driving shaft, a driven shaft, change speed gearing therebetween, a fluid supply responsive to the speed of the driven shaft, multi-stage grip means for varying the gear ratio connection, at least one of which grip means being friction, multi-stage hydraulic control to affect the change in gear ratio, said control having one valve for controlling at least one of said gear ratios, and another means including a valve responsive to the pressure of the fluid supply, and a passage portion coaxial with the driving shaft for controlling one speed ratio.

2. A transmission embodying a driving shaft, a driven shaft, change speed gearing therebetween, a hydraulic control to affect functioning change in transmission connection between the driving and driven shafts through said gearing, mechanical grip means for varying the interconnection of said gearing and functioning in response to said hydraulic control, a driven shaft speed responsive fluid supply for the hydraulic control, said hydraulic control including valve means responsive to the speed responsive fluid supply, and a passage coaxial with one of said shafts, said valve means controlling actuation of one grip means to affect one gear ratio between the shafts, and additional control means for the flow from the supply.

3. A transmission embodying a driving shaft, a driven shaft, change speed gearing therebetween, a multi-stage hydraulic control to affect functioning change in transmission connection between the driving and driven shafts through said gearing and having driven shaft speed responsive valve means, and a passage portion coaxial with the driven shaft, multi-stage grip means functioning in response to said hydraulic control, at least one of which grip means being of the friction type, said valve means and passage portion being a part of the control for one of the gear ratio stages between the shafts, a driven shaft speed responsive fluid supply for the hydraulic control, and additional control means to affect the hydraulic control.

4. A transmission embodying a driving shaft, a driven shaft, change speed gearing therebetween, a fluid supply responsive to the speed of the driven shaft, multi-stage grip means to affect different speed ratios between the shafts, at least one of which grip means being friction, means for controlling said multi-stage grip means, said controlling means including automatically operable fluid control, said fluid control comprising different passage portions extending to different stage grip means, said latter means being provided with shiftable means actuatably responsive from different speeds selectively thru said driven shaft fluid supply for rendering the speed increase from and decrease back to an intermediate speed gear ratio independently of manual intervention.

5. A transmission embodying a driving shaft, a driven shaft, change speed gearing therebetween, a fluid supply responsive to the speed of the driven shaft, a fluid control, multi-stage grip means controlled by the fluid control to effect different speed ratios between the shafts including direct drive, at least one of which grip means being friction, said fluid control comprising automatically operable flow control means and including different passage portions extending to different stage grip means, said latter means being provided with shiftable means actuatably responsive from different speeds selectively thru said driven shaft fluid supply for rendering the speed increase from and decrease back to an intermediate speed gear ratio independently of manual intervention.

6. A transmission embodying a driving shaft, a driven shaft, change speed gearing therebetween, a housing in which said shafts and gearing are mountable, a fluid supply responsive to the speed of the driven shaft, a fluid control, selectively disconnectable multi-stage grip means controlled by the fluid control to effect different speed ratios between the shafts including direct drive, at least one of which grip means being friction, said fluid control comprising flow control means and including different shiftable means actuatably responsive from different speeds selectively in extending to different stage grip means and responsive to said driven shaft fluid supply for automatically rendering one of said gear ratios effective.

7. An automatic transmission comprising a plurality of gear trains, at least one of said gear trains including overrunning gears, a drive shaft, a driven shaft adapted to be connected to said gears and directly to said drive shaft, a plurality of gripping means certain of which have one part permanently connected to said gears and one of which has one part adapted to be directly connected to the drive shaft, thereby providing predetermined gear ratios, whereby the operation of a particular gripping means sets up a transmission ratio different from those set up by the other gripping means, hydraulic means for actuating one or more of the gripping means at the same time and in sequence, means for supplying fluid under pressure, speed responsive means for directing the supply of pressure fluid to said hydraulic means to actuate one or more of said gripping means at the same time and in sequence, whereby a continuous transmission of power uninterrupted by speed variations is set up, and manually operable means adapted to restrain the speed responsive means against speed responsive actuation during a predetermined speed range, whereby a selected transmission ratio may be maintained during said range.

8. An automatic transmission comprising a plurality of gear trains, at least one of said gear trains including overrunning gears, a drive shaft, a driven shaft adapted to be connected to said gears and directly to said drive shaft, a plurality of gripping means including at least one clutch, certain of which gripping means have one part permanently connected to said gears and one of which has one part adapted to be directly connected to the drive shaft, thereby providing predetermined gear ratios, whereby the operation of a particular gripping means sets up a transmission ratio different from those set up by the other gripping means, hydraulic means for actuating one or more of the gripping means at the same time and in sequence, means for supplying fluid under pressure, speed responsive means for directing the supply of pressure fluid to said hydraulic means to actuate one or more of said gripping means at the same time and in sequence, whereby a continuous transmission of power uninterrupted by speed variations is set up, and manually operable means adapted to restrain the speed responsive means against speed responsive actuation during a predetermined speed range, whereby a selected transmission ratio may be maintained during said range.

9. An automatic transmission comprising a plurality of gear trains, at least one of said gear trains including overrunning gears, a drive shaft, a driven shaft adapted to be connected to said gears and directly to said drive shaft, brake and clutch first means certain of which have one part permanently connected to said gears and one of which has one part adapted to be directly connected to the drive shaft, thereby providing predetermined gear ratios, whereby the operation of a particular first means sets up a transmission ratio different from those set up by the other first means, hydraulic means for actuating one or more of the first means at the same time and in sequence, means for supplying fluid under pressure, speed responsive means directing the supply of pressure fluid to said hydraulic means to actuate one or more of said first means at the same time and in sequence, whereby a continuous transmission of power uninterrupted by speed variations is set up, and manually operable means adapted to restrain the speed responsive means against speed responsive actuation during a predetermined speed range, whereby a selected transmission ratio may be maintained during said range.

10. An automatic transmission comprising a plurality of gear trains, at least one of said gear trains including overrunning gears, a drive shaft, a driven shaft adapted to be connected to said gears and directly to said drive shaft, a plurality of gripping means certain of which have one part permanently connected to said gears and one of which has one part adapted to be directly connected to the drive shaft, thereby providing predetermined gear ratios, whereby the operation of a particular gripping means sets up a transmission ratio different from those set up by the other gripping means, means adapted to actuate the gripping means, hydraulic means for actuating one or more of the gripping means at the same time and in sequence, means for supplying fluid under pressure, speed responsive means for directing the supply of pressure fluid to said hydraulic means to actuate one or more of said gripping means at the same time and in sequence, whereby a continuous transmission of power uninterrupted by speed variations is set up, and manually operable means adapted to restrain the speed responsive means against speed responsive actuation during a predetermined speed range, whereby a selected transmission ratio may be maintained during said range.

11. A transmission embodying a driving shaft, a driven shaft, variable speed gears therebetween, a housing in which said shafts and gears are mountable, a fluid supply responsive to the speed of the driven shaft, a fluid distribution system for the fluid supply, selectively disconnectable multi-stage grip means actuated by the fluid from the supply for controlling the gear ratio relationship between said shafts, at least one of which grip means being friction, and control means for the multi-stage grip means, said control means forming a part of said fluid distribution system, and including passage portions extending to the different grip means, said control means further including valve means responsive to the pressure of the fluid supply for automatically controlling one of said gear ratios.

12. A transmission embodying a driving shaft, a driven shaft, change speed gearing therebetween, a housing in which said shafts and gears are mountable, a fluid supply responsive to the speed of the driven shaft, selectively disconnectable multi-stage mechanical grip means to effect different speed ratios between the shafts, means for controlling said multi-stage grip means, said controlling means including automatically operable fluid control, said fluid control comprising different passage portions extending to different stage grip means, said latter means being provided with shiftable means actuatably responsive from different speeds selectively thru said fluid supply to said controlling means, independently of manual intervention for gear ratio changes including speed increase from and decrease back to an intermediate gear ratio.

ESTEL O. WHEATON.

REFERENCES CITED

The following references are of record in the file of this patent:

UNITED STATES PATENTS

| Number | Name | Date |
|---|---|---|
| 794,899 | Sturtevant | July 19, 1905 |
| 907,711 | Anthony | Dec. 29, 1908 |
| 1,199,640 | Vincent | Sept. 26, 1916 |
| 1,523,648 | Jackson | Jan. 20, 1925 |
| 1,619,703 | Chorlton | Mar. 1, 1927 |
| 1,619,705 | Chorlton | Mar. 1, 1927 |
| 1,830,395 | Hanson | Nov. 3, 1931 |
| 1,865,690 | Hanson | July 5, 1932 |
| 1,886,003 | Garrison | Nov. 1, 1932 |
| 2,019,146 | Livermore | Oct. 29, 1935 |
| 2,181,647 | Wheaton | Nov. 28, 1939 |
| 2,245,857 | Hale | June 17, 1941 |
| 2,320,960 | Wheaton | June 1, 1943 |

FOREIGN PATENTS

| Number | Country | Date |
|---|---|---|
| 366,105 | Great Britain | Jan. 18, 1932 |
| 746,253 | France | Mar. 7, 1933 |